United States Patent
Shin (10) Patent No.: US 8,422,335 B2
(45) Date of Patent: Apr. 16, 2013

(54) APPARATUS AND METHOD FOR IMAGING SUBSURFACE STRUCTURE OF TARGET AREA BY USING WAVEFORM INVERSION

(75) Inventor: Changsoo Shin, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 370 days.

(21) Appl. No.: 12/817,799

(22) Filed: Jun. 17, 2010

(65) Prior Publication Data
US 2010/0322032 A1  Dec. 23, 2010

(30) Foreign Application Priority Data
Jun. 17, 2009 (KR) .................... 10-2009-0054071

(51) Int. Cl.
*G01V 1/28* (2006.01)
(52) U.S. Cl.
USPC .................... 367/73; 367/38; 702/14
(58) Field of Classification Search .............. 367/38, 367/73; 702/14, 18
See application file for complete search history.

(56) References Cited

U.S. PATENT DOCUMENTS

| | | | |
|---|---|---|---|
| 6,865,489 B2 * | 3/2005 | Jing | 702/16 |
| 6,999,880 B2 | 2/2006 | Lee | |
| 2007/0282535 A1 | 12/2007 | Sirgue et al. | |
| 2009/0006054 A1 * | 1/2009 | Song | 703/6 |

FOREIGN PATENT DOCUMENTS
WO  2009/002001 A1  12/2008

* cited by examiner

*Primary Examiner* — Ian Lobo
(74) *Attorney, Agent, or Firm* — Rothwell, Figg, Ernst & Manbeck, P.C.

(57) ABSTRACT

Provided are an apparatus and method for imaging the subsurface structure of a target area by using waveform inversion. In the apparatus and method, the subsurface structure of a target area is estimated using waveform inversion of a seismic signal in the frequency domain, the Laplace domain, or the Laplace-Fourier domain, and an objective function is defined by applying a weighting function such that the objective function makes a different contribution for each frequency, each Laplace damping constant, or each Laplace-Fourier damping constant. The objective function is not limited to a particular type of objective function and a weighting function can be automatically determined when a gradient vector for each frequency, each Laplace damping constant, or each Laplace-Fourier damping constant is normalized. In addition, a gradient direction for all frequencies can be defined by applying another weighting function to the sum of respective gradient vectors for all frequencies, all Laplace damping constants, or all Laplace-Fourier damping constants, wherein the weighting function can also be automatically determined by normalization.

14 Claims, 4 Drawing Sheets

APPARATUS AND METHOD FOR IMAGING SUBSURFACE STRUCTURE OF TARGET AREA BY USING WAVEFORM INVERSION

CROSS-REFERENCE TO RELATED APPLICATION

This application claims the benefit under 35 U.S.C. §119 (a) of a Korean Patent Application No. 10-2009-0054071, filed on Jun. 17, 2009, the entire disclosure of which is incorporated herein by reference for all purposes.

BACKGROUND

1. Field

The following description relates to subsurface exploration technology, and more particularly, to a technology of imaging the subsurface structure of a target area by using waveform inversion in a frequency domain, Laplace domain, or a Laplace-Fourier domain.

2. Description of the Related Art

Subsurface exploration is used to identify the subsurface structure and geological characteristics of a specified area and, particularly, to find useful resources (such as oil) buried underground. As the use of underground resources increases, subsurface exploration is widely being conducted not only in land but also in the sea. Subsurface exploration in land or sea plays a crucial role in discovering fossil fuels (e.g., natural gas and oil) which are important energy sources, understanding the subsurface structure of a desired area, and detecting underground water.

One of the most important geological and physical characteristics for accurate subsurface imaging is the seismic propagation velocity of the subsurface. To obtain the seismic propagation velocity of the subsurface of a desired area of land or sea, research is being conducted on a method of receiving and analyzing seismic waves reflected or refracted by the desired area. In this method, the seismic propagation velocity of the subsurface of a target area, that is, an image of the subsurface structure of the target area is obtained by artificially exploding a source wavelet into the target area and performing a predetermined operation using seismic data, i.e., data on a seismic wave reflected or refracted by the target area.

One way of obtaining the seismic propagation velocity of the subsurface by using seismic data is 'waveform inversion.' 'Waveform inversion' is a technique of estimating a subsurface velocity model using prestack seismic data. In waveform inversion, an initial model of an area of interest is constructed, and modeled data is obtained by modeling algorithm. Then, the initial model is iteratively updated using the modeled data and the measured data of an area of interest to reproduce a subsurface structure model close to the actual subsurface structure of the area. That is, data on the actual subsurface structure of the area is obtained by iteratively updating parameters, which represent physical characteristics of the subsurface structure of the area, until errors between modeled data obtained modeling using the subsurface parameters and measured data obtained through actual field exploration satisfy a predetermined condition.

Waveform inversion is one method of analyzing the subsurface structure of an area, which is one of the goals of geophysical exploration, and various mathematical methods are suggested. Representative mathematical methods for waveform inversion is an 'iterative least-squares method' with various objective functions such as a 'logarithmic norm' method. With the development of computers, simple waveform inversion can be achieved using personal computers.

Generally, a unique solution does not exist in waveform inversion. Thus, a method of obtaining an optimal solution by adding a particular condition is used in waveform inversion. In this case, it is optional whether to give weight to convergence or to obtain a more accurate solution from a given measured data. Since an inverse model must be simplified and often requires extreme assumptions, it is important in waveform inversion to make the most of prior geological information related to geophysical characteristics.

If low-frequency data can be used and if there are no computational limitations, seismic waveform inversion has the advantage of providing a more detailed subsurface velocity model than travel time tomography or conventional velocity analysis. About thirty years ago, Lailly and others tackled the seismic inverse problem by using reverse time migration (Lailly, P. 1983, *the Seismic Inverse Problem as a Sequence of Before Stack Migrations*: Society for Industrial and Applied Mathematics, Philadelphia). Since then, geoscientists and applied mathematicians have used a similar back-propagation technique for waveform inversion.

However, real seismic data obtained through actual field exploration presents many obstacles to waveform inversion: the absence of low-frequency data, two-dimensional (2D) acoustic approximations of three-dimensional (3D) real earth wave propagation, and source-receiver coupling to the earth. Noise is perhaps the most important of these obstacles because ambient background vibrations always contaminate real seismic data.

Due to these obstacles, a gradient vector of an objective function for an arbitrary parameter $p_k$ may significantly vary for each frequency, each Laplace damping constant, or each Laplace-Fourier damping constant in waveform inversion in the frequency domain, the Laplace domain, or the Laplace-Fourier domain. In this case, each frequency, each Laplace damping constant, or each Laplace-Fourier damping constant may make a greatly different contribution when a gradient direction for all frequencies, all Laplace damping constants, or all Laplace-Fourier damping constants is determined by adding a gradient vector for each frequency, each Laplace damping constant, or each Laplace-Fourier damping constant. Furthermore, if iterations are performed by applying a gradient vector for all frequencies, all Laplace damping constants, or all Laplace-Fourier damping constants as it is, an additional operation such as a line search is required to determine a step length for parameter update.

SUMMARY

The following description relates to an apparatus and method for imaging the subsurface structure of a target area by using waveform inversion in the frequency domain or by using waveform inversion in the Laplace domain or the Laplace-Fourier domain, which can efficiently utilize insufficient low-frequency components of data obtained through actual field exploration, in order to obtain a velocity model close to the actual subsurface structure of the target area. In particular, the following description relates to an apparatus and method for imaging the subsurface structure of a target area, the apparatus and method capable of equally distributing all frequency components, all Laplace damping constants, or all Laplace-Fourier damping constants in the determination of the direction of a gradient vector and capable of determining a step length without requiring an additional operation such as a line search.

In the method of imaging the subsurface structure of a target area by using waveform inversion, the efficient utilization of insufficient low-frequency components in real data obtained through actual field exploration can be accomplished by performing waveform inversion in a transform domain such as the Laplace domain, or the Laplace-Fourier domain. In the present specification, the term 'imaging the subsurface structure' can be understood as encompassing all methods of obtaining information about the subsurface structure of a target area to identify whether underground resources are present in the target area and to identify geological characteristics of the target area, such as the stratigraphic structure of the target area.

Fourier transform may be used to transform a signal in a time domain into a signal in the frequency domain. The Fourier transform is a mathematical operation that transforms a function in the time domain into a function in the frequency domain. In the Fourier transform, a function in the time domain is multiplied by an exponential function having an exponential term, and the multiplication result is integrated. Here, the exponential term of the exponential function, which is multiplied by the function in the time domain in the Fourier transform, is an imaginary number.

To transform a signal in the time domain into a signal in the Laplace domain or the Laplace-Fourier domain, Laplace transform or Laplace-Fourier transform may be used. The Laplace transform and the Laplace-Fourier transform for waveform inversion are disclosed respectively in PCT Application No. PCT/KR2008/000792, entitled "Method for Velocity Analysis Using Waveform Inversion in Laplace Domain for Geophysical Imaging" and filed on Feb. 11, 2008 by the inventor of the present invention, and in Korean Patent Application No. 2008-0085356, entitled "Apparatus, Method, and Recording Medium for Imaging a Subsurface Using the Waveform Inversion in Laplace-Fourier Domain" and filed on Aug. 29, 2008 also by the inventor of the present invention. Thus, a detailed description of the Laplace transform and the Laplace-Fourier transform for waveform inversion will be omitted.

A conventional method of setting up an objective function for waveform inversion in a transform domain such as the frequency domain, the Laplace domain, or the Laplace-Fourier domain is based on the assumption that the same weighting function is applied to an error (e.g., a root mean square (RMS) error) for each damping constant value (e.g., a frequency w or a Laplace damping constant s). That is, a weighting function is applied uniformly to all damping constant values. This means that even if the amplitude of a gradient vector, which is represented by the difference between measured data and modeled data, significantly varies for each damping constant and even if the amplitude of a gradient vector for all damping constants significantly varies according to the number of iterations, the gradient vector for each damping constant and the gradient vector for all damping constants are used as they are in the calculation of a gradient direction and/or a step length. In this case, a certain damping constant component can be strongly influenced more than other damping constant components when a gradient direction is determined using waveform inversion. Consequently, this can result in the distortion of the gradient direction. Furthermore, since the sum of respective gradient vectors for all damping constants varies significantly according to the number of iterations, an additional algorithm, such as a line search, is required to determine a step length.

Therefore, according to an embodiment of the present invention, an explicit weighting function, which makes an error contribute differently to an objective function according to the value of a damping constant, is used. In particular, according to the embodiment of the present invention, a gradient vector for each damping constant is normalized by applying a first weighting function such that the amplitude of the gradient vector for each damping constant lie between −1 and 1. In addition, a gradient vector for all damping constants is normalized by applying a second weighting function such that a weighted gradient direction for all damping constants lie between −1 and 1.

The first weighting function is a function of a damping constant and may vary according to a frequency and/or a Laplace damping constant. The first and second weighting functions may also vary according to the number of iterations. Values of the first and second weighting functions do not need to be fixed. For example, the values of the first and second weighting functions may be automatically determined when a gradient vector for each frequency or each Laplace damping constant is normalized. Specifically, the first weighting function is a function of a damping constant and may be defined as the inverse of an absolute value of a gradient vector which is the largest among absolute values of respective gradient vectors for all damping constants. In addition, the second weighting function may be defined as the inverse of an absolute value of the sum of the respective gradient vectors for all damping constants which is largest among absolute values of the sums of the respective gradient vectors for all damping constants.

In one general aspect, there is provided a method of estimating the subsurface structure of a target area by using waveform inversion of a seismic signal in a transform domain. The method includes: defining an objective function for each damping constant based on a difference between measured data and modeled data of the subsurface structure in a transform domain; and defining an objective function for all damping constants by adding the objective function for each damping constant, wherein the objective function for each damping constant is added after the objective function for each damping constant is normalized by applying a first weighting function. Here, the transform domain may be a frequency domain, a Laplace domain, or a Laplace-Fourier domain, and a damping constant may be adaptively determined according to the type of transform domain.

The first weighting function may be defined as the inverse of an absolute value of a partial differential of an objective function which is largest among absolute values of partial differentials of the respective objective functions for the damping constants for a parameter $p_k$ that represents the subsurface structure of the target area. In addition, a gradient of the objective function for all damping constants for the parameter $p_k$ which represents the subsurface structure of the target area is normalized by applying the second weighting function.

In another aspect, there is provided an apparatus for imaging the subsurface structure of a target area. The apparatus includes: an input unit receiving time-domain measured data of a seismic signal from the target area; a transform unit transforming the time-domain measured data received from the input unit into measured data in a transform domain; a modeled data generation unit setting up an initial equation, which models the target area, by using a parameter $p_k$ that represents a characteristic of the target area and generating modeled data by solving the initial equation in the transform domain; and a parameter update unit updating the parameter $p_k$ to minimize an objective function for all damping constants by defining an objective function for each damping constant based on a difference between the measured data output from the transform unit and the modeled data output from the modeled data generation unit and defining the objective function for all damping constants by adding the objective function for each damping constant, wherein the parameter update unit defines the objective function for all damping constants by normalizing the objective function for each damping constant using a first weighting function and then adding the normalized objective function for each damping constant.

In another aspect, there is provided a method of imaging the subsurface structure of a target area. The method includes: receiving time-domain measured data of a seismic signal from the target area; transforming the received time-domain measured data into measured data in a transform domain; setting up an initial equation, which models the target area, by using a parameter $p_k$ that represents a characteristic of the target area and generating modeled data by solving the initial equation in the transform domain; and updating the parameter $p_k$ to minimize an objective function for all damping constants by defining an objective function for each damping constant based on a difference between the measured data in the transform domain and the modeled data and defining the objective function for all damping constants by adding the objective function for each damping constant, wherein in the updating of the parameter $p_k$, the objective function for all damping constants is defined by normalizing the objective function for each damping constant using a first weighting function and then adding the normalized objective function for each damping constant. Here, the transform domain may be a frequency domain, a Laplace domain, or a Laplace-Fourier domain, and a damping constant may be adaptively determined according to the type of transform domain.

According to one aspect of the present invention described above, a gradient vector for all damping constants is obtained by applying an explicit first weighting function to a gradient vector for each damping constant in view of the fact that a gradient vector may significantly vary for each damping constant. The first weighting function, which is a function of a damping constant, does not need to be predetermined and may be automatically determined when the gradient vector for each damping constant is normalized. For example, the inverse of an absolute value of a gradient vector, which is largest among absolute values of respective gradient vectors for all damping constants, may be determined to be the first weighting function. Since a derived function of an objective function for a parameter $p_k$, which represents the subsurface structure, is obtained by normalizing the gradient vector for each damping constant and then adding the normalized gradient vector for each damping constant, all damping constants can be equally distributed in the determination of a gradient direction. Therefore, according to the aspect of the present invention, the distortion of the gradient direction due to a relatively large amplitude of the gradient vector for a certain damping constant can be prevented.

According to another aspect of the present invention, the sum of respective gradient vectors for all damping constants can be normalized using a second weighting function. In this case, the second weighting function does not need to be predetermined and may be defined as the inverse of an absolute value of the sum of the respective gradient vectors for all damping constants which is largest among absolute values of the sums of the respective gradient vectors for all damping constants. In this aspect, since the sum of the respective gradient vectors for all damping constants is normalized using the absolute value of the sum of the respective gradient vectors for all damping constants which is largest among the absolute values of the sums of the respective gradient vectors for all damping constants, an additional algorithm such as a line search is not required to determined a step length.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The invention is described more fully hereinafter with reference to the accompanying drawings, in which exemplary embodiments of the invention are shown. Descriptions of well-known functions and constructions are omitted to increase clarity and conciseness. Also, the terms used in the following description are terms defined taking into consideration the functions obtained in accordance with the present invention, and may be changed in accordance with the option of a user or operator or a usual practice. Therefore, the definitions of these terms should be determined based on the entire content of this specification.

'Waveform inversion' according to an embodiment of the present invention refers to the process of reconstructing information about the subsurface structure of a target area (e.g., a velocity or density model of the target area) from measured data obtained through actual field exploration. Waveform inversion may involve a modeling process in which an analyzer sets up an arbitrary model of the subsurface structure of a target area and obtains modeled data from the set-up model.

To image the subsurface structure of a target area using waveform inversion according to the embodiment of the present invention, a new model of the subsurface structure of the target area is constructed using the differences between modeled values (modeled data) computed through modeling and measured values (measured data) obtained through actual field exploration. Then, modeled values (modeled data) are obtained again by modeling the new model of the subsurface structure and are compared with the measured values. This process of updating the model of the subsurface structure of the target area by iteratively comparing the modeled values with the measured values may be repeated until the differences or errors between the modeled values and the measured values are minimized or become less than a predetermined threshold value. When the differences or errors are within a predetermined range, a model identical or close to the actual subsurface structure of the target area can be attained.

The waveform inversion according to the embodiment of the present invention can be implemented by a computation apparatus which processes various signals to generate image data needed to image the subsurface structure of a target area, a computer-readable recording medium on which signal processing algorithms are recorded, and a method of imaging the subsurface structure of a target area by using the computation apparatus or the computer-readable recording medium.

The principles of waveform inversion according to an exemplary embodiment of the present invention will first be described with reference to FIG. 1.

Figure 1:
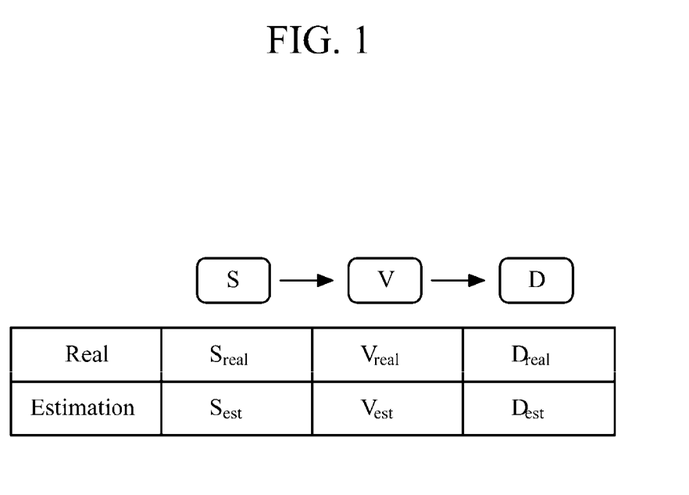
FIG. 1 is a diagram for explaining the principles of waveform inversion according to an exemplary embodiment of the present invention.

In FIG. 1, V denotes a characteristic of the subsurface structure of a target area, S denotes an input applied to the characteristic V, and D denotes an output when the input S is applied to the characteristic V.

The ultimate goal of waveform inversion is to find the characteristic V of the subsurface structure of the target area by using the measured output D. If a velocity distribution (i.e., a velocity model) of a seismic wave among characteristics of the subsurface structure of the target area is obtained, the subsurface structure can be easily imaged using the velocity distribution. Thus, it is assumed that the characteristic V is a velocity distribution, that the input S is a source (e.g., a pressure field or a signal resulting from an explosion), and that the output D is seismic data.

Measured seismic data $D_{real}$ can be obtained through actual field exploration of a target area, and estimated seismic data $D_{est}$ can be obtained from modeled values ($V_{est}$ and $S_{est}$) obtained by modeling the target area. To identify the subsurface structure of the target area, estimated velocity data $V_{est}$ and/or source data $S_{est}$ are/is updated such that the difference between the measured seismic data $D_{real}$ and the estimated seismic data $D_{est}$ is minimized or becomes less than a predetermined threshold value. This updating process for minimizing the difference between the measured seismic data $D_{real}$ and the estimated seismic data $D_{est}$ may be iterated until an estimated velocity distribution $V_{est}$ becomes equal to an actual velocity distribution $V_{real}$. Here, V representing the subsurface structure of a target area may indicate only a velocity distribution as described above or may indicate velocity/density, impedance, and Lame's constants/density distribution.

Figure 2:
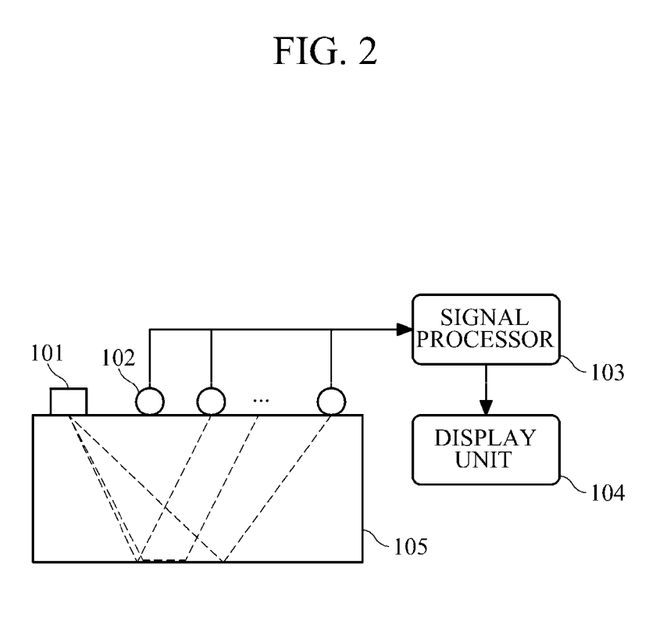
FIG. 2 is a schematic block diagram of an apparatus for imaging the subsurface structure of a target area according to an exemplary embodiment of the present invention.

FIG. 2 is a schematic block diagram of an apparatus for imaging the subsurface structure of a target area according to an exemplary embodiment of the present invention. Referring to FIG. 2, the apparatus may include a source 101, a plurality of receivers 102, a signal processor 103, and a display unit 104.

The source 101 generates waves (source wavelets) that are to be transmitted to a target area 105. The source 101 may be, but is not limited to, an air gun or a vibroseis. Pre-known waves may be used as source waves. However, waves generated by an air gun may also be used as the source waves for, for example, marine seismic exploration. In this case, source wave estimation must be performed as part of waveform inversion.

The receivers 102 sense and receive seismic signals from the target area 105. The receivers 102 are not limited to a particular type of receiver. For example, the receivers 102 may be sound wave detectors or seismic wave detectors. To efficiently sense seismic waves, the receivers 102 may be arranged within or adjacent to the target area 105 in a predetermined pattern (e.g., a offset pattern). The display unit 104 outputs signals received from the signal processor 103. The display unit 104 may be a display device that displays data processed in the form of an image or a graph.

The signal processor 103 may be a signal processing device or computer program that receives seismic signals from the receivers 102 and generates data, which indicates the subsurface structure of the target area 105, in a predetermined form. The data generated by the signal processor 103 is sent to and thus displayed on the display unit 104. The signal processor 103 may perform waveform inversion using input seismic data in such a way as will be described later and thus generate data (e.g., a velocity model or image data generated using the velocity model) indicating the subsurface structure of the target area 105.

According to the embodiment of the present invention, the signal processor 103 performs signal processing not in a time domain but by using waveform inversion in a predetermined transform domain. For example, the signal processor 103 may perform waveform inversion in a transform domain such as a frequency domain, a Laplace domain, or a Laplace-Fourier domain. In waveform inversion in the Laplace domain or the Laplace-Fourier domain, low-frequency components, which can be easily ignored due to their low signal intensity, can be used. In addition, waveform inversion in the Laplace domain or the Laplace-Fourier domain can use both low-frequency components and the amplitude and/or phase information of a damped wavefield. In particular, since an objective function giving a different weight to each damping constant is used as will be described later, a situation where a certain damping constant component is over-influenced or under-influenced in the calculation of a gradient direction can be prevented. Thus, according to the embodiment of the present invention, the accuracy of parameter update can be increased, thereby reducing the amount of computation required for waveform inversion.

More specifically, the signal processor 103 receives measured data in a time domain and transforms the measured data in the time domain into measured data in a transform domain such as the frequency domain, the Laplace domain, or the Laplace-Fourier domain. For example, in the case of the domain transformation of the measured data from the time domain to the frequency domain, a time-domain waveform of an input seismic wave may be multiplied by an exponential function $e^{-\omega t}$, which is expressed as a function of a frequency $\omega$, and then the multiplication result may be integrated with respect to time. The domain transformation of the measured data from the time domain to another domain is disclosed in detail in the above-cited patent applications filed by the inventor of the present invention, and thus a description thereof will be omitted.

The signal processor 103 sets up a wave equation that includes parameters representing characteristics of the target area 105. The wave equation may be set up first in the time domain. A value of each parameter included in the wave equation is an initial estimated value arbitrarily selected and determined. The wave equation may include a source signal. If a wave generated from an arbitrary explosion was used as a source signal, the source signal also may be an estimated wave equation.

The signal processor 103 obtains modeled data by transforming the domain of the wave equation to a predetermined transform domain and solving the wave equation in the predetermined transform domain. Then, the signal processor 103 compares the measured data with the modeled data. The signal processor 103 updates the arbitrarily selected parameters based on the comparison result, for example, based on the difference (error) between the measured data and the modeled data.

The measured data and the modeled data may be compared using an objective function. In the embodiment of the present invention, an objective function is defined in a transform domain such as the frequency domain, the Laplace domain, or the Laplace-Fourier domain. An objective function that can be used is not limited to a particular type of objective function. In addition, an objective function may be represented by, for example, errors, an $l^1$- or $l^2$-norm, an $l^2$-norm of a logarithmic wavefield, a real-valued Huber function, or a complex-valued Huber function.

A conventional method of setting up an objective function for waveform inversion in a transform domain is based on the assumption that a weighting function of an error is the same for each damping constant component. That is, a weighting function for all damping constants is obtained by simply adding an error for each damping constant. In this case, however, if the amplitude of an error significantly varies for each damping constant, one of the damping constants may greatly affect the calculation of the gradient direction while another damping constant hardly affects the calculation of the gradient direction. This makes it difficult to equally distribute all damping constant components in the calculation of the gradient direction, resulting in a distorted calculation of the gradient direction during waveform inversion in a transform domain.

On the other hand, according to the embodiment of the present invention, an explicit weighting function, which makes an error contribute differently to an objective function according to a damping constant, is used. That is, an objective function for each damping constant is multiplied by a predetermined weighting function (hereinafter, referred to as a 'first weighting function') which is a function of a damping constant. Even if the difference (e.g., an error) between a measured signal and a modeled signal significantly varies for each damping constant, the first weighting function, if properly selected, enables the amplitude of a gradient vector to be within a predetermined range (e.g., a range of −1 to 1). Therefore, according to the embodiment of the present invention, a gradient vector for all damping constants is obtained by applying the first weighting function to a gradient vector for each damping constant such that the variation in the amplitude of the gradient vector according to a damping constant is within a predetermined range and by adding the application results. Accordingly, all damping constant components are equally distributed in the calculation of the gradient direction, thereby increasing the accuracy of calculation of the gradient direction.

According to the embodiment of the present invention, a second weighting function may additionally be applied to the gradient vector (e.g., a partial differential of an objective function for a parameter $p_k$) for all damping constants, wherein the gradient vector for all damping constants is represented by the sum of the respective gradient vector for the damping constants to which the first weighting function has been applied. The second weighting function, if properly determined, enables the amplitude of the gradient vector for all damping constants to be within a predetermined range (e.g., a range of −1 to 1).

Values of first and second weighting constants or the first and second weighting functions do not need to be predetermined or fixed to arbitrary values. For example, the first weighting function may be automatically determined when a gradient vector for each damping constant is normalized. In addition, the second weighting function may be automatically determined when a gradient vector for all damping constants is normalized. A specific method of determining the first and second weighting functions through normalization will be described later.

After updating the parameters, the signal processor 103 obtains modeled data again from an equation including the updated parameters and compares the modeled data with the measured data. Then, the signal processor 103 updates the parameters and/or the estimated source wave again based on the comparison result. These comparing and updating processes may be iterated until an error value becomes 'zero' or less than a predetermined threshold value. When the error value is 'zero' or less than the predetermined threshold value, the signal processor 103 may generate data, which indicates the subsurface structure of the target area 105, based on the last updated parameters and outputs the generated data to the display unit 104.

A method of determining the first and second weighting functions, which are applied by the signal processor 103 to waveform inversion in the frequency domain, will now be described. In the following description, the frequency domain is used as an example of a transform domain. However, it is obvious to those of ordinary skill in the art that the same description can be applied to the Laplace domain or the Laplace-Fourier domain. In addition, a function defined using root mean square (RMS) errors is used as an example of an objective function for waveform inversion. However, it is obvious to those of ordinary skill in the art that the objective function for waveform inversion is not limited to the above function.

As described above, in the embodiment of the present invention, the sum of RMS errors obtained by $N_r$ receivers respectively for $N_s$ sources is not defined as it is as an objective function at each frequency. Instead, the sum of RMS errors obtained by the $N_r$ receivers respectively for the $N_s$ sources is multiplied by the first weighting function, and the multiplication result is defined as an objective function at each frequency. The objective function at each frequency may be defined by Equation 1:

$$E(p) = \left[\sum_{s}^{N_s}\sum_{r}^{N_r} M_{\varepsilon,c}(r_{s,r})\right]g(w), \quad (1)$$

where $r_{s,r}=\hat{u}_{s,r}-\hat{d}_{s,r}$ is the differences between the modeled data and the measured data, and $N_s$ and $N_r$ respectively are the number of sources and the number of receivers. In addition, $M_{\varepsilon,c}(r)$ may be any type of mathematical equation that can be used to calculate the difference between measured data and modeled data, such as the $l^1$-norm, the $l^2$-norm, the $l^2$-norm of the logarithmic wavefield, or the Huber function. Also, $g(w)$ indicates the first weighting function whose value varies according to a frequency or the number of iterations.

A specific value of the first weighting function does not need to be predetermined or fixed to a value that remains constant regardless of the number of iterations. The value of the first weighting function may be automatically determined when a gradient vector for a parameter $p_k$ at each frequency is normalized. For example, the inverse of an absolute value of a gradient vector, which is largest among absolute values of respective gradient vectors for the parameter $p_k$ at all frequencies, may be determined to be the first weighting function.

In addition, according to the embodiment of the present invention, the second weighting function G may be additionally applied to a gradient vector for all frequencies for the parameter $p_k$, that is, the sum of the respective gradient vectors for the parameter $p_k$ at all frequencies. The second weighting function also does not need to be predetermined. For example, the inverse of an absolute value of the sum of the respective gradient vectors for the parameter $p_k$ at all frequencies, which is largest among absolute values of the sums of the respective gradient to vectors for the parameter $p_k$ at all frequencies, may be determined to be the second weighting function.

The process of determining the first and second weighting functions can be mathematically represented as follows.

According to the embodiment of the present invention, a weighted gradient direction for all frequencies may be defined by Equation 2:

$$\frac{\partial E}{\partial p_k} = \left[\sum_w \left[Re \sum_s (\text{diag}(v_k^T v_k) + \lambda I)^{-1} \left[\frac{\partial \hat{u}_{s,r}}{\partial p_k}\right]^T r^*\right] g(w)\right] G, \quad (2)$$

where $v_k$ is a virtual source vector, $\lambda$ is a positive damping constant, I is an identity matrix, * is a complex conjugate, and g(w) is the first weighting function that is the inverse of an absolute value of a gradient vector which is largest among absolute values of gradient vectors at each frequencies.

In Equation 2, the first weighting function g(w) may be automatically determined when a gradient vector at each frequency is normalized. Similarly, the second weighting function G may be automatically determined when the sum of gradient vectors at all frequencies is normalized. If the first and second weighting functions are applied, the amplitude of a gradient vector at each frequency falls within a range of −1 to 1, and the amplitude of the sum of gradient vectors at all frequencies also falls within the range of −1 to 1. Here, it is assumed that the first and second weighting functions g(w) and G are not functions of a parameter such as velocity.

Therefore, the first weighting function g(w) and the second weighting function G can be defined respectively by Equations 3 and 4 below:

$$g(w) = \frac{1}{\text{MAX}\left[\text{ABS}\left[Re \sum_s (\text{diag}(v_k^T v_k) + \lambda I)^{-1} \left[\frac{\partial \hat{u}_{s,r}}{\partial p_k}\right]^T r^*\right]\right]}, \quad (3)$$

$$G = \frac{1}{\text{MAX}\left[\text{ABS}\left[\sum_w Re\left[\sum_s (\text{diag}(v_k^T v_k) + \lambda I)^{-1} \left[\frac{\partial \hat{u}_{s,r}}{\partial p_k}\right]^T r^*\right] g(w)\right]\right]}, \quad (4)$$

where ABS( ) is an absolute value of a gradient vector, and MAX( ) is a maximum absolute value of a gradient vector component.

Referring to Equation 3, the first weighting function g(w) is represented by the inverse of an absolute value of a gradient vector which is largest among those of gradient vectors at each frequencies. Thus, if an objective function is defined as the sum of values obtained by multiplying errors at each frequencies by the first weighting function g(w), a situation where a certain frequency component is over-influenced or under-influenced in the determination of the gradient direction can be prevented.

Referring to Equation 4, the second weighting function G is represented by the inverse of an absolute value of the sum of gradient vectors at all frequencies which is largest among absolute values of the sums of gradient vectors at all frequencies. Thus, if an objective function is defined as the result of multiplying the second weighting function G by the sum of the values obtained by multiplying errors at each frequencies by the first weighting function g(w), the sum of gradient vectors according to the number of iterations is normalized. If the sum of gradient vectors, which has not been normalized, is used for waveform inversion, the rate of parameter update for next computation, that is, a step length, should be determined using an additional algorithm such as a line search. However, according to the embodiment of the present invention, since the sum of gradient vectors at all frequencies is normalized using the second weighting function G, the step length can be determined without an additional algorithm. For example, the step length may be fixed to an arbitrary value or may have a value that varies according to the number of iterations. In the latter case, the value of the step length may be high in the initial stage of waveform inversion and may be low in the later stage of waveform inversion.

Figure 3:
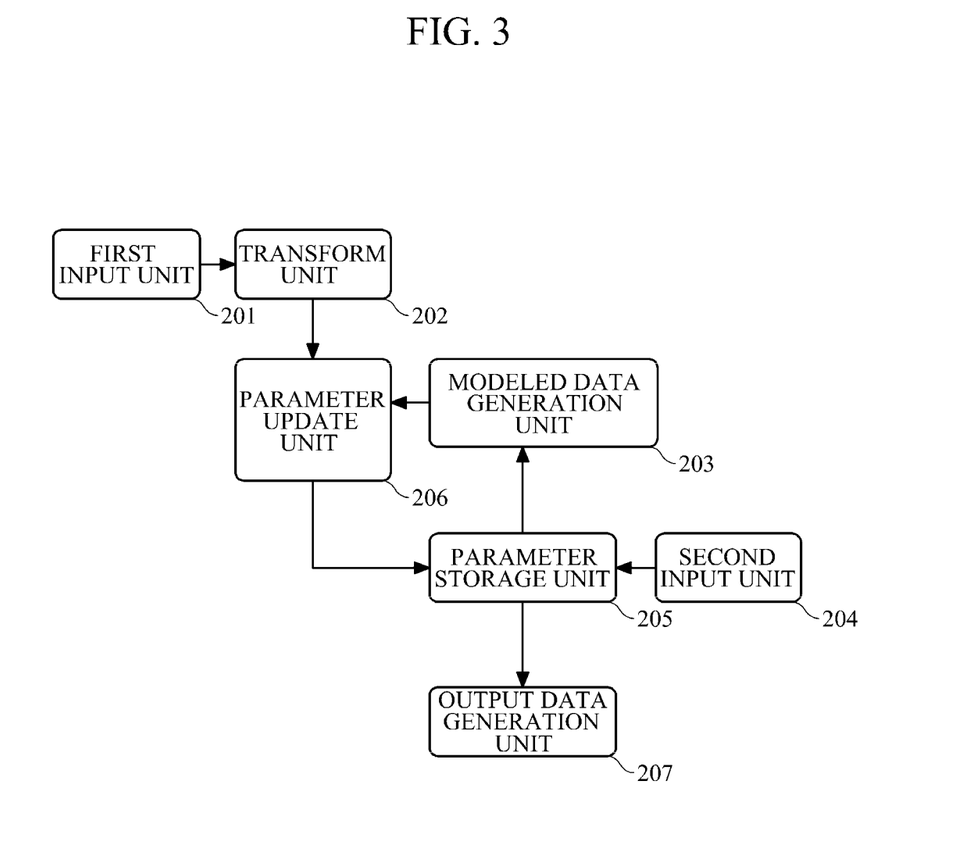
FIG. 3 is a block diagram of a signal processor included in the apparatus of FIG. 2.

FIG. 3 is a block diagram of the signal processor 103 included in the apparatus of FIG. 2. Referring to FIG. 3, the signal processor 103 includes a first input unit 201, a transform unit 202, a modeled data generation unit 203, a second input unit 204, a parameter storage unit 205, a parameter update unit 206, and an output data generation unit 207.

The first input unit 201 is connected to the receivers 102 (see FIG. 2) and receives time-domain measured data of the target area 105 from the receivers 102. Then, the first input unit 201 sends the time-domain measured data to the transform unit 202. The transform unit 202 performs the Fourier transform, the Laplace transform, or the Laplace-Fourier transform on the time-domain measured data, thereby transforming the measured data in the time domain into measured data in a predetermined transform domain.

The modeled data generation unit 203, the second input unit 204, and the parameter storage unit 205 receive parameters representing characteristics of the modeled target area 105 and generate transform-domain modeled data of the target area 105. Here, the initially input parameters may be arbitrarily determined values. Specifically, when parameters representing characteristics of the modeled target area 105 are input to the second input unit 204, the parameter storage unit 205 stores the input parameters. Then, the modeled data generation unit 203 sets up an equation that includes the parameters stored in the parameter storage unit 205, transforms the domain of the equation into a predetermined transform domain, and obtains modeled data by solving the equation in the predetermined transform domain.

Thus, an output of the transform unit 202 can be understood as measured data in a predetermined transform domain into which the measured data in the time domain is transformed, and an output of the modeled data generation unit 203 can be understood as estimated data or modeled data of the target area 105 in the same transform domain as that of the measured data. Accordingly, the parameter update unit 206 compares the output of the transform unit 202 with the output of the modeled data generation unit 203 and performs a predetermined operation, thereby updating the parameters stored in the parameter storage unit 205. Here, the parameter update unit 206 updates the stored parameters such that the difference between the measured data and the modeled data is minimized or becomes less than a predetermined threshold value.

According to the embodiment of the present invention, the parameter update unit 206 may use an arbitrary function as an objective function. As described above, an objective function for each damping constant may be defined by applying the first weighting function which is a function of a damping constant, and an objective function for all damping constants may be defined by applying the second weighting function in addition to the first weighting function. In addition, values of the first and second weighting functions do not need to be predetermined and may be automatically determined by normalization of a derived function of an objective function.

Figure 4:
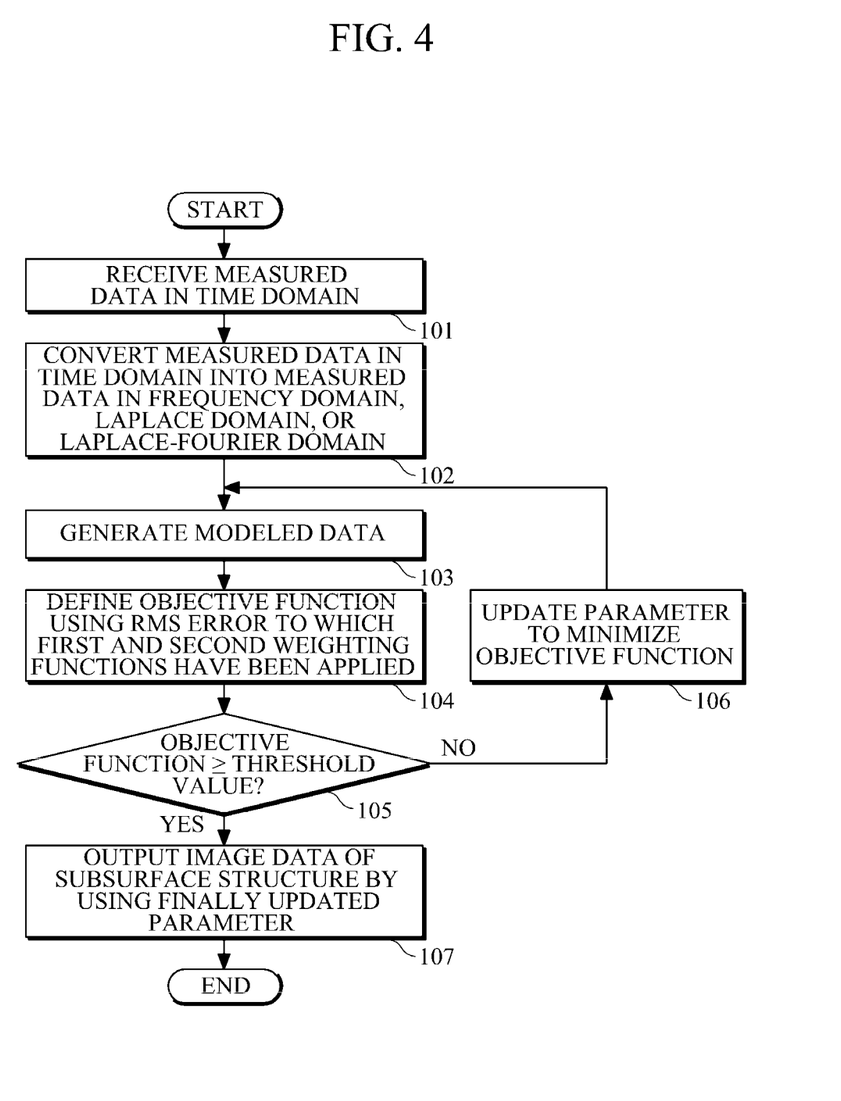
FIG. 4 is a flowchart illustrating a method of imaging the subsurface structure of a target area according to an exemplary embodiment of the present invention.

FIG. 4 is a flowchart illustrating a method of imaging the subsurface structure of a target area according to an exemplary embodiment of the present invention. The method can be executed by the above-described imaging apparatus (see FIG. 2) or can be implemented as a recording medium executable by the imaging apparatus.

Referring to FIGS. 2 and 4, the imaging apparatus collects measured data from a target area (operation 101). The measured data may be data on seismic waves reflected by the target area. The imaging apparatus transforms the domain of the input measured data into a predetermined transform domain (operation 102). Then, the imaging apparatus generates modeled data by modeling the target area (operation 103). In operation 103, the imaging apparatus may set up a matrix equation by using parameters representing characteristics of the target area and generate modeled data by solving the matrix equation. To this end, although not shown in the drawing, the imaging method may further include an operation of collecting initial parameters for the target area.

Next, the imaging apparatus generates an objective function which calculates the difference between the measured data and the modeled data in a transform domain such as a frequency domain (operation 104). The objective function may be a function having the first weighting function and/or the second weighting function applied to residuals. Next, the initial parameters are iteratively updated to minimize the objective function (operations 105 and 106). The updating of the initial parameters may be iterated until an objective function newly generated using the updated parameters becomes less than a predetermined threshold value. More specifically, an objective function generated using initial modeled data or an objective function generated using the updated parameters is compared with a predetermined threshold value (operation 105). If the objective function is less than the predetermined threshold value, operation 107 is performed. If not, the parameters for generating the modeled data are updated in operation 106. According to the embodiment of the present invention, a different weight is given to each damping constant component when a gradient of the objective function is calculated.

When the parameters are finally updated through the above operations, image data of the target area is generated using the finally updated parameters (operation 107). For example, when a velocity model of the target area is used as a parameter, image data may be generated based on a velocity model which is finally obtained by iteratively updating the velocity model.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of estimating the subsurface structure of a target area by using waveform inversion of a seismic signal, the method comprising:
    transforming time-domain measured data into measured data in a transform domain;
    generating modeled data by solving an initial equation, which models the target area by using a parameter $p_k$ that represents the subsurface structure of the target area;
    updating the parameter $p_k$ in a direction to minimize an objective function for all damping constants defined by adding an objective function for each damping constant which is individually normalized using a first weighting function;
    generating an output image of the target area using the updated parameter $p_k$ if the objective function generated using the updated parameter $p_k$ is less than a predetermined threshold value.

2. The method of claim 1, wherein the transform domain is a frequency domain, a Laplace domain, or a Laplace-Fourier domain.

3. The method of claim 2, wherein the first weighting function is defined as the inverse of an absolute value of a partial differential of an objective function which is largest among absolute values of partial differentials of the respective objective functions for the damping constants for the parameter $p_k$ that represents the subsurface structure of the target area.

4. The method of claim 2, wherein the transform domain is the frequency domain, and an objective function at each frequency is defined by Equation E-1:

$$E(p) = \left[\sum_s^{N_s}\sum_r^{N_r} M_{\varepsilon,c}(r_{s,r})\right]g(w), \quad \text{(E-1)}$$

wherein $r_{s,r} = \hat{u}_{s,r} - \hat{d}_{s,r}$ is the differences between the modeled data and the measured data, $N_s$ and $N_r$ respectively are the number of sources and the number of receivers, $M_{\varepsilon,c}(r)$ is a function of the difference between the measured data and the modeled data, and $g(w)$ is the first weighting function at each frequency $w$.

5. The method of claim 4, wherein the updating direction of the parameter $p_k$ is decided using a gradient of the objective function for all damping constants normalized by applying a second weighting function.

6. The method of claim 5, wherein the normalized gradient of the objective function for all damping constants is defined by Equation E-2, and the first weighting function $g(w)$ and the second weighting function $G$ in Equation E-2 are respectively defined by Equations E-3 and E-4:

$$\frac{\partial E}{\partial p_k} = \left[\sum_w \left[Re\sum_s (\mathrm{diag}(v_k^T v_k) + \lambda I)^{-1}\left[\frac{\partial \hat{u}_{s,r}}{\partial p_k}\right]^T r^*\right]g(w)\right]G, \quad \text{(E-2)}$$

$$g(w) = \frac{1}{\mathrm{MAX}\left[\mathrm{ABS}\left[Re\sum_s (\mathrm{diag}(v_k^T v_k) + \lambda I)^{-1}\left[\frac{\partial \hat{u}_{s,r}}{\partial p_k}\right]^T r^*\right]\right]}, \quad \text{(E-3)}$$

$$G = \frac{1}{\mathrm{MAX}\left[\mathrm{ABS}\left[\sum_w Re\left[\sum_s (\mathrm{diag}(v_k^T v_k) + \lambda I)^{-1}\left[\frac{\partial \hat{u}_{s,r}}{\partial p_k}\right]^T r^*\right]g(w)\right]\right]}, \quad \text{(E-4)}$$

where $v_k$ is a virtual source vector, $\lambda$ is a positive damping constant, I is an identity matrix, r is a residual vector, * is a complex conjugate, ABS( ) is a function of an absolute value, and MAX( ) is a function of a maximum absolute value.

7. The method of claim 6, wherein a step length for the waveform inversion has a value which remains constant regardless of the number of iterations or a value which is inversely proportional to the number of iterations.

8. An apparatus for imaging the subsurface structure of a target area, the apparatus comprising:

an input unit receiving time-domain measured data of a seismic signal from the target area;

a transform unit transforming the time-domain measured data received from the input unit into measured data in a transform domain;

a modeled data generation unit setting up an initial equation, which models the target area, by using a parameter $p_k$ that represents a characteristic of the target area and generating modeled data by solving the initial equation in the transform domain; and a parameter update unit updating the parameter $p_k$ to minimize an objective function for all damping constants by defining an objective function for each damping constant based on a difference between the measured data output from the transform unit and the modeled data output from the modeled data generation unit and defining the objective function for all damping constants by adding the objective function for each damping constant, wherein the parameter update unit defines the objective function for all damping constants by normalizing the objective function for each damping constant using a first weighting function and then adding the normalized objective function for each damping constant.

9. The apparatus of claim 8, wherein the transform domain is a frequency domain, a Laplace domain, or a Laplace-Fourier domain.

10. The apparatus of claim 9, wherein the first weighting function is defined as the inverse of an absolute value of a partial differential of an objective function which is largest among absolute values of partial differentials of the respective objective functions for the damping constants for the parameter $p_k$ that represents the subsurface structure of the target area.

11. The apparatus of claim 10, wherein a gradient of the objective function for all damping constants for the parameter $p_k$ is normalized by applying a second weighting function.

12. The apparatus of claim 8, wherein the modeled data generation unit regenerates the modeled data by using the parameter $p_k$ updated by the parameter update unit, and the parameter update unit updates the updated parameter $p_k$ by comparing the measured data in the transform domain with the regenerated modeled data.

13. The apparatus of claim 12, wherein a step length for updating the parameter $p_k$ has a value which remains constant regardless of the number of iterations or a value which is inversely proportional to the number of iterations.

14. A method of imaging the subsurface structure of a target area, the method comprising:

receiving time-domain measured data of a seismic signal from the target area;

transforming the received time-domain measured data into measured data in a transform domain selected from a frequency domain, a Laplace domain, and a Laplace-Fourier domain;

setting up an initial equation, which models the target area, by using a parameter $p_k$ that represents a characteristic of the target area and generating modeled data by solving the initial equation in the transform domain; and updating the parameter $p_k$ to minimize an objective function for all damping constants by defining an objective function for each damping constant based on a difference between the measured data in the transform domain and the modeled data and defining the objective function for all damping constants by adding the objective function for each damping constant;

generating an output image of the target area using updated parameters if the objective function generated using the updated parameters is less than a predetermined threshold value;

wherein the objective function for all damping constants is defined by normalizing the objective function for each damping constant using a first weighting function and then adding the normalized objective function for each damping constant.

\* \* \* \* \*